No. 865,358. PATENTED SEPT. 10, 1907.
G. CITELLI.
REPEATING MECHANISM FOR TIMEPIECES.
APPLICATION FILED MAY 18, 1906.
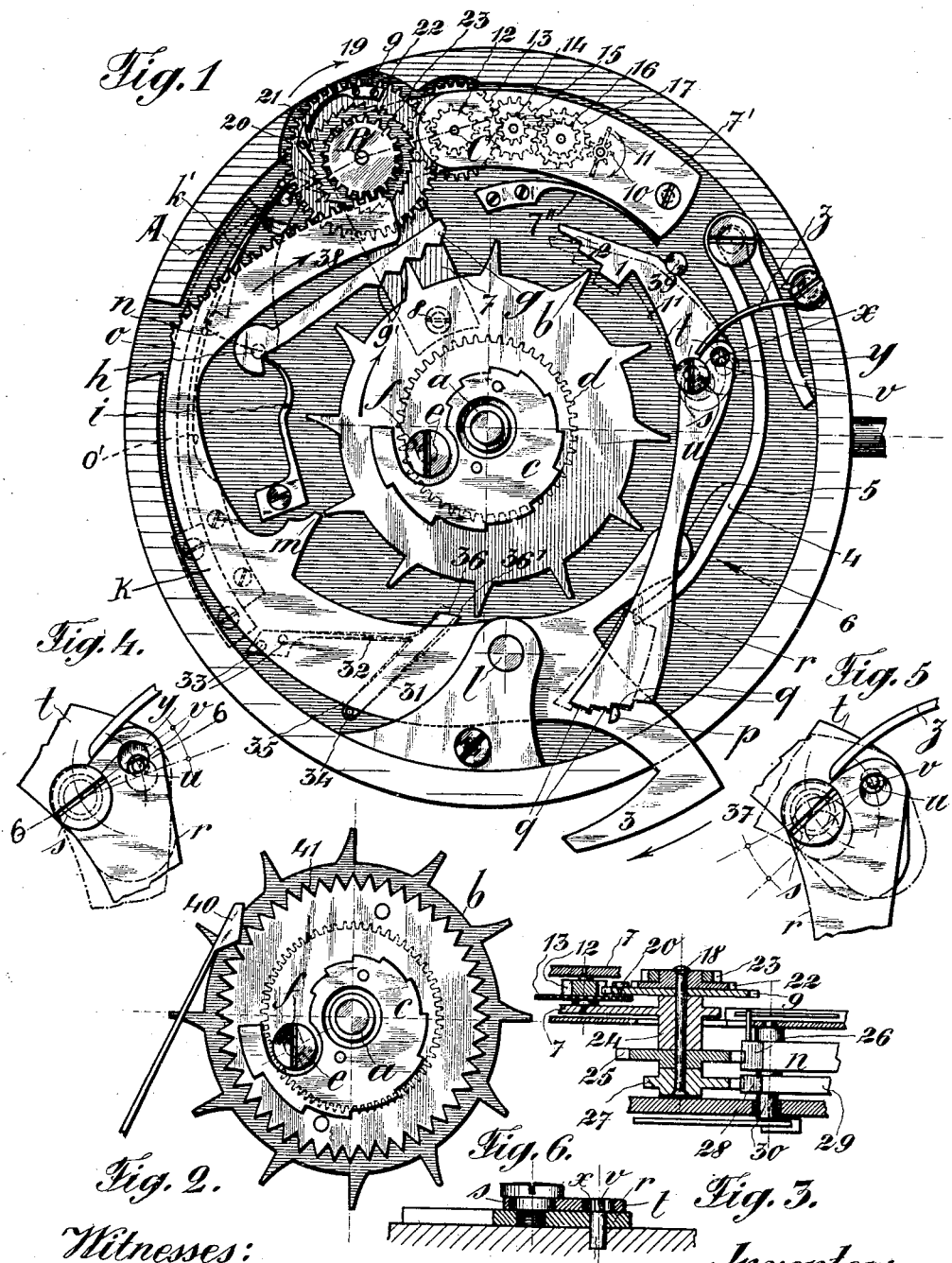
Witnesses:
C. Heymann
L. Waldman
Inventor:
Giuseppe Citelli
by B. Singer
atty

UNITED STATES PATENT OFFICE.

GIUSEPPE CITELLI, OF LA CHAUX-DE-FONDS, SWITZERLAND.

REPEATING MECHANISM FOR TIMEPIECES.

No. 865,358.　　　　Specification of Letters Patent.　　　　Patented Sept. 10, 1907.

Application filed May 18, 1906. Serial No. 317,548.

*To all whom it may concern:*

Be it known that I, GIUSEPPE CITELLI, a subject of Italy, residing at La Chaux-de-Fonds, Canton of Neuchâtel, Switzerland, have invented new and useful Improvements in Repeating Mechanism for Timepieces, of which the following is a specification.

This invention relates to improvements in repeating mechanism for watches and clocks and has for its object the provision of such mechanism wherein the construction is efficient, simple and durable.

The invention will be more fully described in connection with the accompanying drawing and will be more particularly pointed out and ascertained in and by the appended claims.

In the drawing:—Figure 1 is a view in elevation of a mechanism embodying the main features of my invention. Fig. 2 is a detail view of a modified construction of one part of the mechanism. Fig. 3 is a sectional view on line A—B—C. Figs. 4 and 5 are enlarged detail views of a part of mechanism for limiting movement of the quarter hour striker. Fig. 6 is a sectional view on line —6—6 of Fig. 4.

Like characters of reference designate similar parts throughout the different figures of the drawing.

As shown $b$ indicates a quarter hour wheel provided with twelve teeth and adapted to make one revolution in twelve hours and also serving to coöperate with a quarter hour limiting device, hereinafter described, for limiting the striking of the quarter hour striker. $c$ designates a snail adapted to coöperate with mechanism for striking the hours and rigidly secured to wheel $b$. Said wheel $b$ and snail $c$ are loosely mounted upon an arbor $a$ and are loosely connected with a driven wheel $d$ desirably in the following manner.
Wheel $b$ is provided with a slot $f$ adapted to receive the shank of a headed screw $e$ which is rigidly secured to wheel $d$ by threaded engagement therewith, the head of said screw $e$ bearing against wheel $b$. Said loose connection permits of a step by step movement of the wheel $b$ and snail $c$ from the constantly rotated wheel $d$. A ratchet mechanism is provided which preferably coöperates with the wheel $b$ to effect intermittent rotation thereof under the action of wheel $d$ and as shown said ratchet mechanism comprises a ratchet lever $g$ pivoted at $h$ and normally held in engagement with the teeth of wheel $b$ by a spring $i$. As shown said ratchet lever is provided with four teeth $g'$ so proportioned and disposed as to always engage one of the teeth of the wheel $b$, the latter at each intermittent step moving 1-48th of a revolution. The distance between the outer faces of the outermost teeth $g'$ is equal to the distance between the teeth of the wheel $b$ so that when the tooth of the wheel $b$ shown in Fig. 1 reaches the last tooth $g'$ the next adjacent tooth of the wheel $b$ will engage the first of the teeth $g'$ thereby providing continuous engagement of the ratchet mechanism with the teeth of the wheel $b$. It will thus be seen that the wheel $b$ will remain in the position shown in Fig. 1 until the wheel $d$ has moved a sufficient distance to bring the screw $e$ to the opposite end of the slot $f$ whereupon a solid engagement will be effected between the wheel $d$ and wheel $b$ so that the latter will be rotated against the resistance of the ratchet mechanism until the tooth of the wheel $b$ reaches the lower end of the next outer ratchet tooth $g'$ whereupon the spring $i$ will serve to move the ratchet lever $g$ toward the wheel $b$ forcing the tooth of wheel $b$ into the next forward cavity between the two outermost teeth $g'$. This forward movement of the wheel $b$ is permitted by the slot $f$ and the wheel $b$ will remain stationary until the screw $e$ has again reached the forward end of the slot $f$.

The repeating mechanism is operated manually by means of an operating member preferably in the form of a segment lever $k$ which as shown is pivoted at $l$. Said lever $k$ is provided with a segment rack $k'$, adapted to actuate the hammer or striker mechanism hereinafter described, and a handle portion 3 adapted to project through the watch or clock case in a manner to be accessible to the user. The lever $k$ is preferably held in an initial or starting position by a spring and as shown said lever is provided with a tail portion 5 which is engaged by a wire spring 4 suitably anchored to a stationary part of the movement as illustrated. Said lever $k$ is provided with means adapted to engage the snail $c$ so that movement of the lever in the direction of arrow 38 will be limited in accordance with the teeth of the snail $c$ and as shown said means consists of a projection $m$ adapted to engage the teeth of the snail $c$. In order to prevent rotation of the wheel $b$ in a direction contrary to the arrow marked thereon when the segment lever $k$ is actuated in the direction of the arrow 38 I provide a stop mechanism which is preferably spring actuated and as shown consists of the following parts. A spring 32 anchored at 33 to any fixed portion of the movement carries on its outer end a dog 31, one end of which 36 is adapted to project into the path of the teeth of the wheel $b$, and the other end of which is provided with a stud 34 adapted to engage a cam surface 35 formed on the lever $k$. The spring 32 is tensioned to normally throw the dog 31 in the position indicated at 36' but the stud 34 engaging the cam surface 35 holds the dog 31 in a retracted position as shown in full lines when the lever $k$ is in an initial position. When however the lever $k$ is swung in the direction of the arrow 37 the cam surface 35 will recede from the position shown and will permit the dog to assume the position shown in dotted lines.

The striking mechanism comprises hour and quarter 110 hour gongs, strikers therefor and mechanism for actuating said strikers, preferably including a regulator train, adapted to be operated by the segment rack $k'$. According to the improved device herein shown the mechanism for actuating the strikers is movably mounted and is thrown out of operative relation with the strikers during the non-repeating movement of the lever $k$ and is thrown into operative relation with the strikers during the repeating movement of the lever $k$. The non-repeating movement of the lever $k$ is indicated by the arrow 38 and the repeating movement will be in a reverse direction to that indicated by said arrow.

Referring to the specific embodiment of the above mentioned devices as herein shown $o$ designates the hour gong adapted to be sounded by a hammer $n$ and $o'$ designates a quarter hour gong adapted to be sounded by a hammer 29. Said hammers $n$ and 29 are loosely mounted on an arbor 30, as will be seen by reference to Fig. 3, and are provided with engaging portions 26 and 28 respectively adapted to be engaged by the hammer or striker operating mechanism and oscillated on the arbor 30 in a manner to strike the gongs $o$ and $o'$.

The striker operating mechanism is provided with a movable mounting which as shown comprises a bridge 7 pivotally secured at 8 to a stationary part of the movement. Said bridge 7 is provided with a bearing 24 in which an arbor 18 is loosely mounted. Said arbor carries at its lower end below the bearing 24 a rigidly mounted hour striking wheel 25 provided with 12 teeth and a rigidly mounted quarter hour striking wheel 27 provided with three teeth. Said hour wheel 25 is adapted to coöperate with the engaging portion 26 of the hour striker $n$ and said wheel 27 is adapted to coöperate with the engaging portion 28 of the quarter hour striker 29. Above the bearing 24 the arbor 18 carries a rigidly mounted wheel 9 which in the present instance is adapted to mesh with the regulator train and which will hereinafter be termed the regulator wheel. Said wheel 9 carries a ratchet pawl 20 and a spring 21 adapted to engage said pawl. Immediately above said wheel 9 there is provided a ratchet wheel 22 which is loosely mounted on the arbor 18 and which is engaged by the pawl 20. The ratchet wheel 22 is provided with a hub on which is rigidly secured a gear wheel 23 adapted to mesh with the rack $k'$ of the segment lever $k$. When the segment lever $k$ is swung in a non-repeating direction as indicated by the arrow 38 it will rotate the wheels 23 and 22 in a contra-clockwise direction thereby permitting the pawl 20 to ride freely over the teeth of the ratchet 22. This movement of the segment lever through its mesh engagement with said wheel 23 will swing the bridge 7 in the direction of the arrow 19 a sufficient distance to carry the wheels 25 and 27 out of engaging proximity with the strikers $n$ and 29 thereby preventing operation thereof during the non-repeating movement of the segment lever. Upon reverse or repeating movement of the segment lever $k$ such mesh engagement will serve to return the bridge 7 to an extreme left position bringing the wheels 25 and 27 into operative relation with the strikers $n$ and 29. It will be understood that the return movement of the segment lever $k$ is effected by spring 4. Such return movement of the segment lever $k$ will rotate the wheels 23 and 22 in a clockwise direction and the latter acting through the pawl 20 will rotate the wheel 9 and the latter will communicate its rotative movement through arbor 18 to the wheels 25 and 27 thereby sounding the gongs.

It is desirable to regulate the repeating movement of the segment lever under the action of spring 4 so that the hours and quarter hours will be struck at a relatively moderate rate of speed to obtain audible distinctness and to this end a regulator is desirably provided, preferably in the form of a train of gears meshing with the regulator proper and in the present embodiment such regulator is mounted upon the bridge 7. Conveniently said bridge 7 is provided with an extension 7' carrying a train of gears comprising a gear 12 meshing with gear 9 and gears 13, 14, 15, 16 and 17 meshing with a gear 10 to which is rigidly secured the regulator fan 11.

It will be seen from the foregoing that the regulator train will offer sufficient resistance to prevent operation of the wheel 9 when the lever $k$ is swung in the direction of the arrow 38 and that it will serve to modify or regulate the speed of the wheels 25 and 27 when the regulator $k$ is being swung in a repeating position, reverse to the direction indicated by the arrow 38, under the action of spring 4. A spring 7'' is desirably provided having its free end engaging the extension 7' so that the bridge 7 will normally occupy an extreme left position bringing the wheels 25 and 27 into engagement with the hammers $n$ and 29.

Assuming that the lever $k$ is in its starting position its repeating or return movement under the action of spring 4 will correspond to its non-repeating movement under manual operation of hook or handle 3 and it will be further understood that the number of hours struck will be dependent upon the extent of movement of the lever $k$. If the snail $c$ is in the position shown in Fig. 1 when the lever $k$ is actuated the tooth or projection $m$ will strike one of the stepped portions of the snail $c$ farthest from its axis of rotation or center and the extent of movement of the lever $k$ will be restricted relatively speaking. If the snail $c$ occupied a reverse position to that shown in Fig. 1 permitting the projection $m$ to strike one of the stepped portions of the snail nearest its axis of rotation a greater movement of the lever $k$ would be permitted and therefore a greater number of strokes would be imparted to the hour striker. It will thus be seen that the snail $c$ which is operated by the movement controls or limits the swing of the lever $k$ in a manner to effect a number of strokes of the hour striker corresponding to the division of time indicated by the hands of the watch or clock to which the mechanism is applied.

It will be obvious that means will be necessary to prevent or regulate the operation of the wheel 27 so as to indicate the quarter hours by one, two or three strokes of the striker 27 providing the time to be repeated is a fraction of an hour and to prevent operation of the striker 29 providing the time to be repeated is an even hour. To this end quarter hour limiting mechanism is provided which coöperates, in the preferred construction, with the quarter hour wheel $b$ and the segment lever $k$ and as shown such mechanism is of the following construction.

A lever composed of two sections $r$ and $t$ is provided and desirably said sections are pivotally united with each other at s and one of said sections preferably t is united or pivotally mounted to a stationary part of the movement by a stud u. The stud u fits closely in an aperture in the section t and is provided with a reduced shank v which fits loosely in a relatively enlarged opening x in the section r. A spring z normally engages an elongated part y of the section r and tends to force the free ends of said sections toward the wheel b. A stop 39 limits movement of section t to the right and a stud p on the lever k limits movement of the section r to the right or rather serves to throw the sections into the position shown in Fig. 1 by engagement with teeth q upon section r. The outer end of section t is provided with stepped portions or teeth adapted for engagement with the teeth of the wheel b. It will be observed by reference to the enlarged detail views, Figs. 4 and 5, that the spring z exerts a downward and a somewhat rearward pressure on the extension y and this pressure is exerted at a point to the left of the pivot u so that the spring acts through the section r and its pivotal connection s with t to draw the latter inwardly toward the wheel b at its free end. Owing to the free play afforded by the enlarged opening x and the reduced shank v the rearward pressure exerted by the spring z tends to swing the section r around its pivot s so that the free end of the section r will swing toward the wheel b. Now the swinging movement of said sections is limited by the position of the teeth of the wheel b. If said wheel b is in a position so that one of its teeth will be engaged by the stepped portion 2 of the section t the latter will move inwardly, when the stud p releases the section r, a greater distance than if the tooth of the wheel b were engaged by the stepped portion 1 of section t as will be readily seen by reference to Fig. 1. Now when the lever k is swung through a non-repeating movement in the direction of arrow 37 the stud p will be released from the teeth q and will permit the sections r and t to swing inwardly into the position shown in dotted lines under the influence of spring z until such inward movement is limited by engagement of one of the stepped portions of section t with one of the teeth of the wheel b. When the lever k is being swung by the spring 4 in a repeating direction and the hours are being sounded on the gong o, by mechanism hereinbefore described, its return or repeating movement will be limited by engagement of the pin p with whatever tooth q is in its path. It will thus be seen that if the last tooth q to the right is in the path of the stud or pin p a greater extent of movement will be permitted on the part of the lever k than if the stud p engaged the last tooth q to the left and therefore the quarter hour striker 29 will sound the gong o' one, two or three times depending upon which tooth q is engaged by the pin p. It will further be obvious that the position of the teeth q will be controlled by the teeth upon the section t which engaged the teeth of wheel b in various positions dependent upon the time and that the limit of movement of section t will also arrest section r. When the lever k returns and the pin p engages the teeth q a longitudinal or endwise movement will be imparted to the section r and owing to the free play afforded by the opening x, see Fig. 5, the section r will act through the pivot s to raise the section t about its pivot u until engagement is effected with the stop 39 which position is shown in Fig. 1.

In lieu of the form of ratchet mechanism shown in Fig. 1 a ratchet wheel 41 may be secured to the wheel b in a manner to coöperate with a ratchet lever 40 as shown in Fig. 2.

I claim:—

1. In a device of the class described the combination of an hour snail, a quarter hour wheel rigidly secured thereto and provided with teeth, a constantly driven wheel loosely connected with said quarter hour wheel, a ratchet lever effecting intermittent movement of said quarter hour wheel, a segment lever provided with a projection or tooth adapted to engage said snail for limiting movement of said lever in one direction, a spring for restoring said lever to an initial position, an hour and a quarter hour gong, hour and quarter hour strikers therefor, striker operating mechanism, a regulating train therefor, a pivotally mounted bridge carrying said striker operating mechanism and regulating train and permitting movement of said striker operating mechanism into and out of driving relation with said strikers, said segment lever being provided with a rack driving said striker operating mechanism and serving when the segment lever is swung in opposite directions to throw said striker operating mechanism into and out of operative relation with said strikers, and quarter hour limiting mechanism coöperating with the teeth of said quarter hour wheel and said segment lever.

2. In a device of the class described comprising in combination, an hour snail, means for imparting a step by step movement thereto, a segment lever provided with a projection or tooth adapted to engage said snail for limiting movement of said lever in one direction, a spring for restoring said lever to an initial position, an hour gong, a striker therefor, striker operating mechanism, a regulating train therefor, and a pivotally mounted bridge carrying said striker operating mechanism and regulating train and permitting movement of said striker operating mechanism into and out of relation with said striker, said segment lever engaging said striker operating mechanism and serving to throw the same into and out of driving relation with said striker when said lever is swung in opposite directions.

3. In a device of the class described comprising in combination, an hour snail adapted to be operated by the movement, a swinging operating lever engaging said snail whereby its movement in one direction is limited by said snail, an hour gong, a striker therefor, striker operating mechanism, a regulating train for said mechanism, and a pivotally mounted bridge carrying said striker operating mechanism and regulating train and permitting movement of said mechanism into and out of relation with said striker, said lever engaging said striker operating mechanism and serving to throw the same into and out of driving relation with said striker when said lever is swung in opposite directions.

4. In a device of the class described comprising in combination, an hour snail adapted to be operated by the movement, a swinging operating lever engaging said snail whereby its movement in one direction is limited by said snail, an hour gong, a striker therefor, striker operating mechanism, and a pivotally mounted bridge carrying said operating mechanism and permitting movement thereof into and out of driving relation with said striker, said lever engaging said mechanism and serving to throw the same into and out of driving relation with said striker when said lever is thrown in opposite directions.

5. In a device of the class described comprising in combination, an hour snail adapted to be driven by the movement, an operating member adapted to engage said snail whereby its movement is limited, an hour gong, striker operating mechanism, a regulator therefor, and a pivotally mounted bridge for said mechanism permitting movement thereof into and out of operative relation with said striker when said mechanism is engaged by said member.

6. In a device of the class described comprising in combination, an hour snail adapted to be driven by the movement, an operating member adapted to engage said snail whereby its movement is limited, an hour gong, striker operating mechanism, and a movable mounting for said striker operating mechanism permitting movement thereof into and out of operative relation with said striker when said mechanism is engaged by said member.

7. In a device of the class described comprising in combination, an hour snail and a quarter hour wheel adapted to be driven from the movement, an operating member adapted to engage said snail whereby its movement is limited, hour and quarter hour gongs, hour and quarter hour strikers, striker operating mechanism therefor, a movable mounting for said striker operating mechanism permitting movement thereof into and out of operative relation with said strikers when said mechanism is engaged by said operating member, and quarter hour limiting mechanism coöperating with said quarter hour wheel and said member.

8. In a device of the class described comprising in combination, an hour snail and a quarter hour wheel adapted to be driven from the movement, an operating member adapted to engage said snail whereby its movement is limited, hour and quarter hour gongs, hour and quarter hour strikers, striker operating mechanism therefor, a movable mounting for said striker operating mechanism permitting movement thereof into and out of operative relation with said strikers when said mechanism is engaged by said operating member, and quarter hour limiting mechanism comprising a sectional lever coöperating with said quarter hour wheel and said member.

9. In a device of the class described comprising in combination, an hour snail and a quarter hour wheel adapted to be driven from the movement, an operating member provided with a stud adapted to engage said snail whereby its movement is limited, hour and quarter hour gongs, hour and quarter hour strikers, striker operating mechanism therefor, a movable mounting for said striker operating mechanism permitting movement thereof into and out of operative relation with said strikers when said mechanism is engaged by said operating member, and quarter hour limiting mechanism comprising a sectional lever composed of two sections, said sections being pivotally united and one of said sections being pivotally mounted and each of said sections having stepped portions or teeth adapted to engage the stud of said actuating member and the teeth of said quarter hour wheel respectively.

In testimony whereof I have signed my name to this specification in the presence of two subscribing witnesses.

GIUSEPPE CITELLI.

Witnesses:
　ALBT. CUSCHEN,
　JEAN J. JAQUET.